United States Patent [19]
Johnson et al.

[11] Patent Number: 5,331,489
[45] Date of Patent: Jul. 19, 1994

[54] GIMBAL FOR A FLEXURE FOR TOP-TERMINATED HEADS

[75] Inventors: Lyle G. Johnson, Minneapolis; Yoshiki Midori, Edina, both of Minn.

[73] Assignee: Seagate Technology, Inc., Scotts Valley, Calif.

[21] Appl. No.: 976,163

[22] Filed: Nov. 12, 1992

[51] Int. Cl.⁵ .............................................. G11B 5/48
[52] U.S. Cl. .................................................. 360/104
[58] Field of Search ................................... 360/103–105

[56] References Cited
U.S. PATENT DOCUMENTS 5,156,704  10/1992  Kemp ........................... 360/103 X Primary Examiner—John H. Wolff
Attorney, Agent, or Firm—Edward P. Heller, III

[57] ABSTRACT

A gimbal formed integral with a load beam by through etching a pattern at the end of the beam to define a pair of tabs connected by a pair of beams; half etching from the head direction one tab with an defined area masked to form a load button; and half etching the beam from the other direction to provide the proper gimbal stiffness. In practice, the head is glued to the other tab and load is applied through the button. The tabs are shaped to permit wire connections to top surface electrical contact terminals.

2 Claims, 8 Drawing Sheets

GIMBAL FOR A FLEXURE FOR TOP-TERMINATED HEADS

RELATED APPLICATION

This application is related to co-pending U.S. patent application Ser. No. 07/975,352 filed coincidentally with this application, assigned to the assignee of the present application and incorporated herein by reference as if included here in its entirety.

BACKGROUND OF THE INVENTION

1. Field of the Invention

This invention relates generally to the field of flexures for supporting the slider which carries the read/write transducer in a hard disc drive data storage device, and more particularly, but not by way of limitation, to a flexure which is particularly suited to use with a slider which has wire connection terminals for the transducer on its top surface.

2. Brief Description of the Related Art

The above-cited co-pending U.S. patent application discloses a one-piece, or unitary, flexure for mounting a slider body which in turn includes a transducer for recording and retrieving data—also referred to as writing and reading, respectively—in the magnetic medium on the surface of a rigid rotating disc. The slider body includes a self-acting hydrodynamic air bearing surface which interacts with a very thin layer of air pulled along with the spinning disc to "fly" the slider slightly above the disc surface. The above-cited Patent Application includes claims concerning a slider mounting tab formed in its gimbal section and intended to be adhesively bonded to the top surface of the slider body in the area closely adjacent to the trailing edge of the slider body. Such an attachment scheme anticipates that the transducer used for reading and writing is located on the trailing surface of the slider body and that the transducer termination points—for connection via wires to the read/write electronics of the disc drive—are also located on the trailing surface of the slider body. Heads using this type of transducer termination are the most common in current use.

Recent developments in automated production techniques, however, have lead to the development of heads in which the transducer terminations are on the top surface of the slider body in the area closely adjacent the trailing surface of the slider body. Since the above-cited Patent Application anticipates using this portion of the slider for attachment to the flexure, another configuration of the gimbal components was needed to allow for the use of top-terminated head assemblies.

SUMMARY OF THE INVENTION

The flexure design of the present invention provides a one-piece flexure in which the gimbal components necessary to mount the slider, to allow roll and pitch gimballing of the slider and to apply a load force to the slider to establish proper cooperative relationship between the head and the disc are formed using the techniques of chemical etching and half-etching. The gimbal portion of the flexure includes a slider mounting tab which extends from an end beam connecting the gimbal beams back toward and over the central portion of the trailing edge of the slider, and leaves the lateral portion of the trailing edge of the slider uncovered, which allows for the passage of the wires connected to the transducer terminals. The shape of the load point tab is modified to further provide space for the transducer terminations.

It is an object of the present invention to provide a flexure for mounting and supporting a magnetic recording head that utilizes transducer terminations on the top surface of the slider body that carries the transducer.

It is another object of the invention to provide a flexure and wiring scheme which allows for simple automation of the operation which attaches the wire leads to the transducer terminations.

These and other objects, benefits and features of the present invention may be best understood by referring to the following detailed description of the invention which is intended to be read in conjunction with the accompanying drawings.

DETAILED DESCRIPTION OF THE INVENTION

Figure 1:
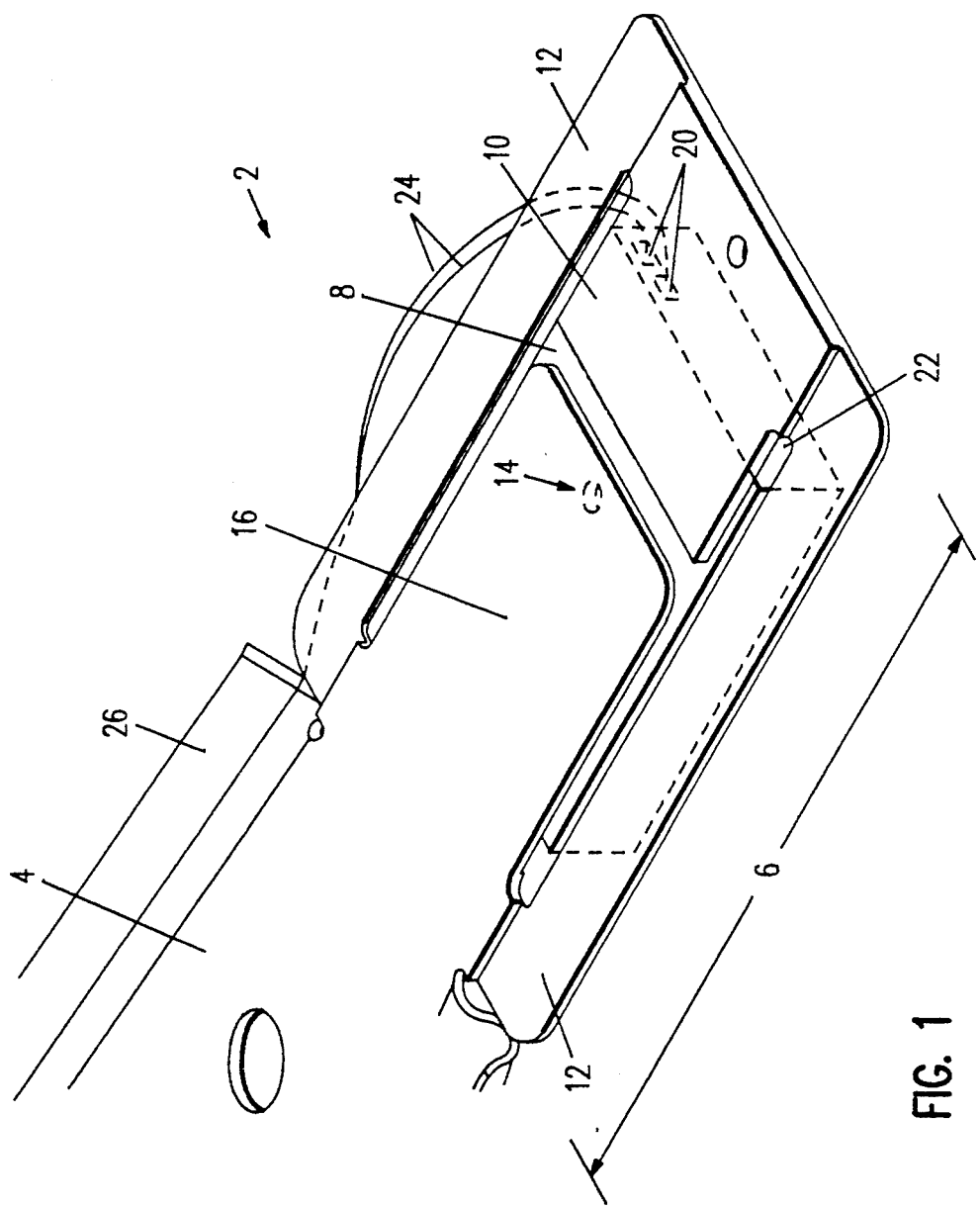
FIG. 1 is a partial perspective view of the flexure/head assembly disclosed in the incorporated co-pending application.

Referring now to FIG. 1, shown is a partial perspective view of a flexure/head assembly 2, made in accordance with the above-cited co-pending U.S. patent application, which includes a portion of the rigid beam 4 and the gimbal section 6, or gimbal Since the present invention is related only to changes in this gimbal section 6, the rigid beam 4, compliant beams and attachment section (both not shown) will not be subjects of discussion herein.

As shown in FIG. 1, a slider body, or slider, 8 is adhesively attached to a slider mounting tab 10 formed in the gimbal section 6. The slider mounting tab 10 is connected to the remainder of the flexure via a pair of half-etched gimbal beams 12 which are laterally displaced from the slider mounting tab 10. The load force supplied by the compliant beams (not shown) and transferred by the rigid beam 4 is applied to the slider 8 by a load point button 14 which is located on the surface of a load point tab 16. As can be seen in FIG. 1, the load point tab 16 is also half-etched, but on the opposite side of the material from the half-etched side of the gimbal beams 12, and the load point button 14 is preferably formed by not half-etching the load point tab 16 in the desired location for the load point button, i.e., the load point button 14 is left at the full material thickness while the remainder of the load point tab 16 is half-etched away.

Also shown in FIG. 1 are a pair of transducer terminations 20 located on the trailing surface 22 of the slider 8. In the example illustrated in FIG. 1, it is assumed that the transducer (not shown) used to read and write data on the disc (also not shown) is of the well known inductive type which requires connection of only two wires at the end of a transducer coil structure (not shown). While other types of transducers will be discussed in more detail below, this inductive type of transducer is adequate for the discussion of the figure.

In FIG. 1 a pair of wires 24 are shown connected to the transducer terminations 20, from which the wires 24 are then lead in a short loop under the adjacent gimbal beam 12 and into a channel 26 formed in the rigid beam 4.

It will be apparent to one skilled in the art that the structure of FIG. 1, as disclosed in detail in the above-cited co-pending U.S. patent application, is particularly well suited for the mounting of this type of transducer/slider assembly, or head.

An analysis of FIG. 1 does, however, demonstrate a particular drawback to the use of this type of slider, particularly in the path taken by the wires 24 as they are routed back to the channel 26 in the rigid beam 4. In the type of sliders envisioned for use with the disclosed gimbal, the Z-axis height—or the height from the slider surface that interacts with the disc surface to the top surface of the slider—is envisioned to be less than 0.025 inches. It is easy to imagine from the view of FIG. 1, that the short loop of wires 24 might sag toward and contact the disc surface. This could easily lead to the wearing through of the thin insulation on the wires 24 and the shorting out of the signals carried by the wires 24. The present invention obviates this tendency, as will be discussed below.

Figure 2:
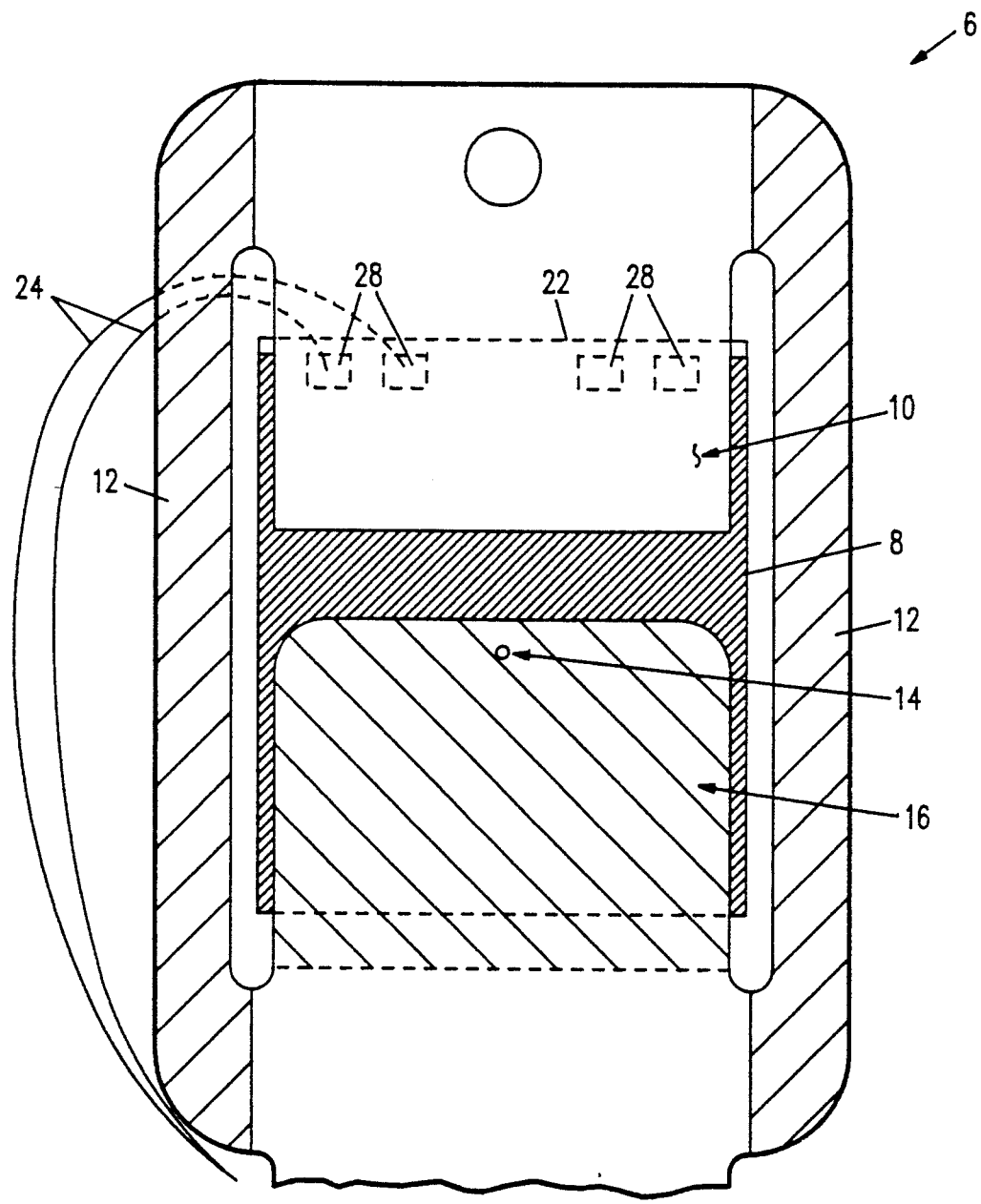
FIG. 2 is a plan view of the gimbal section of the flexure of FIG. 1.

FIG. 2 is a plan view of the gimbal portion 6 of the flexure/head assembly of FIG. 1, in which the various elements of the gimbal portion 6 have been numerically designated as in the discussion of FIG. 1 above. The areas shaded lower-left-to-upper-right indicate that material has been removed from the near side as viewed, while the area shaded upper-left-to-lower-right indicates half-etching on the far side. As can be seen, the wires 24 for reading and writing data are attached to the transducer terminations (not shown) on the trailing edge 22 of the slider 8. In this view, the general potential location of transducer terminations located on the top surface of the slider 8 are shown by dashed-line boxes at 28 as being closely adjacent the trailing edge of the slider. It is obvious that these terminations 28 would lie directly under a portion of the slider mounting tab 10 with this configuration of gimbal, rendering the use of top-terminated sliders impossible.

Figure 3:
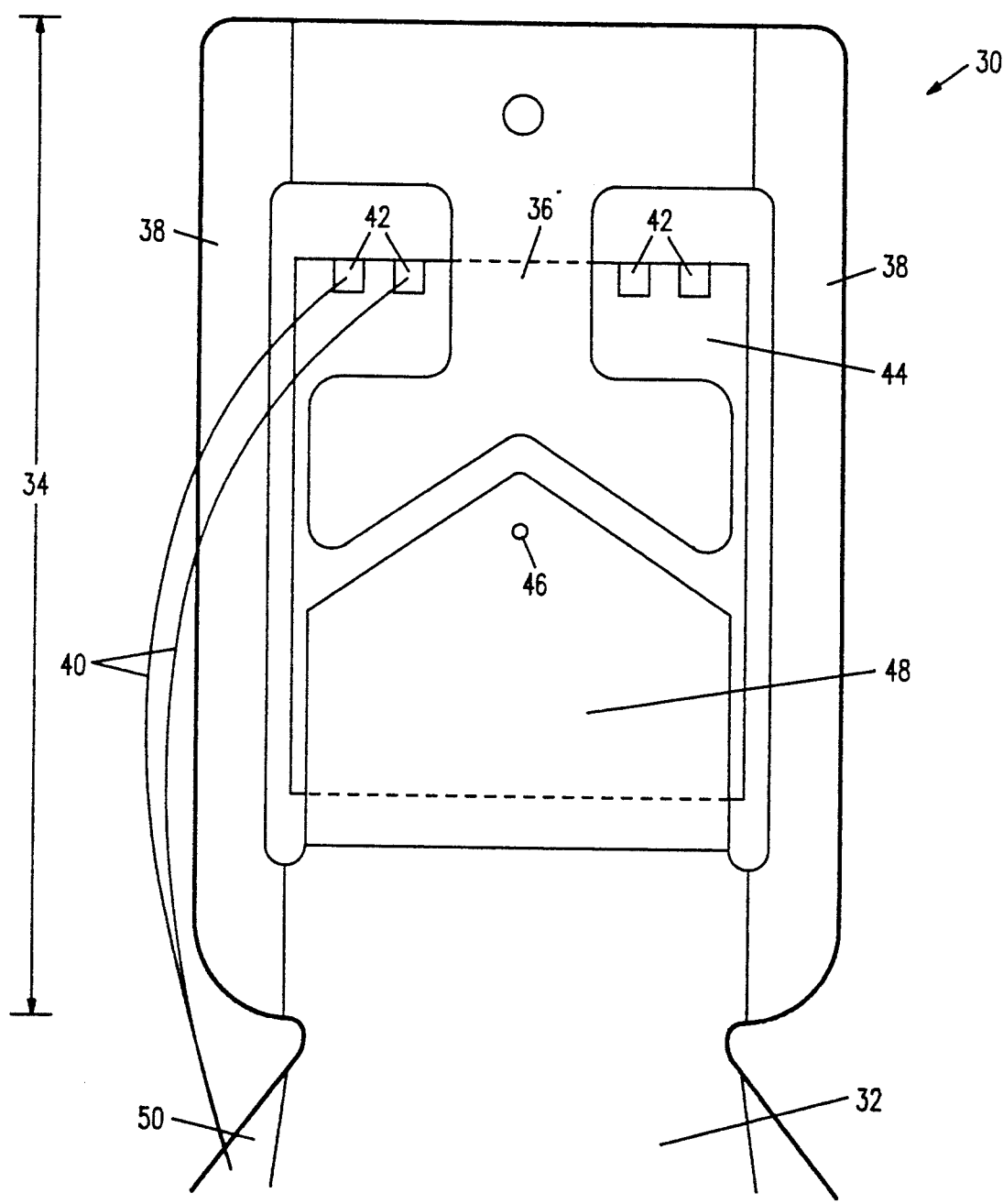
FIG. 3 is a plan view of the gimbal section of a flexure/head assembly made in accordance with a first embodiment of the present invention.

Turning now to FIG. 3, shown is a partial plan view of a flexure/head assembly 30 made in accordance with the present invention. The attachment surface and compliant beams (both not shown) and the rigid beam 32 are anticipated to be as disclosed in the above-cited co-pending U.S. patent application and will not be discussed herein. An examination of the gimbal portion 34, or gimbal of FIG. 3 shows that the slider mounting tab 36 has been modified to assume the shape of an inverted "T", i.e., the T-shaped slider mounting tab 36 is connected to an end beam 37 which connects the compliant ends of the gimbal beams 38 at the base of the upright of the "T". Forming the slider mounting tab 36 in this manner opens a pair of "windows" on either side of the upright of the "T" to allow the connection of wires 40 to the transducer terminations 42 on the top surface of the slider 44. The edge of the slider mounting tab 36 closest to the load point button 46 has also been modified to extend in an inverted "V", or chevron, shape toward the load point tab 48, and the load point tab 48 has been complimentarily modified. Since the functional operation of the load point tab 48 is defined by a triangle formed by the base of the load point tab 48 and the load point button 46, these changes in no way effect the operation of the gimbal portion 34 of the flexure/head assembly 30.

Two distinct advantages are obtained with this new gimbal:

1. the wires 40 connected to the transducer terminations 42 can now be routed to the channels 50 at the sides of the rigid beam 32 without passing below the gimbal beams 38, thus preventing undesired contact between the wires 40 and the disc surface, and 2. since the slider 44 and flexure (not separately designated) are assembled together in the same axis in which the wires 40 are brought into contact with the transducer terminations 42, the gimbal design of the present invention lends itself particularly well to automated production.

It should also be noted that FIG. 3 shows two pairs of transducer terminations 42, disposed on opposite sides of the slider mounting tab 36. It is a common practice to manufacture heads with transducers near both outer edges of the slider. Such a practice allows the head to be used on either the upper or lower surface of the disc while maintaining vertical alignment of all transducers in the disc drive. The symmetrical shape of the entire flexure of the present invention also facilitates this capability.

Figure 4:
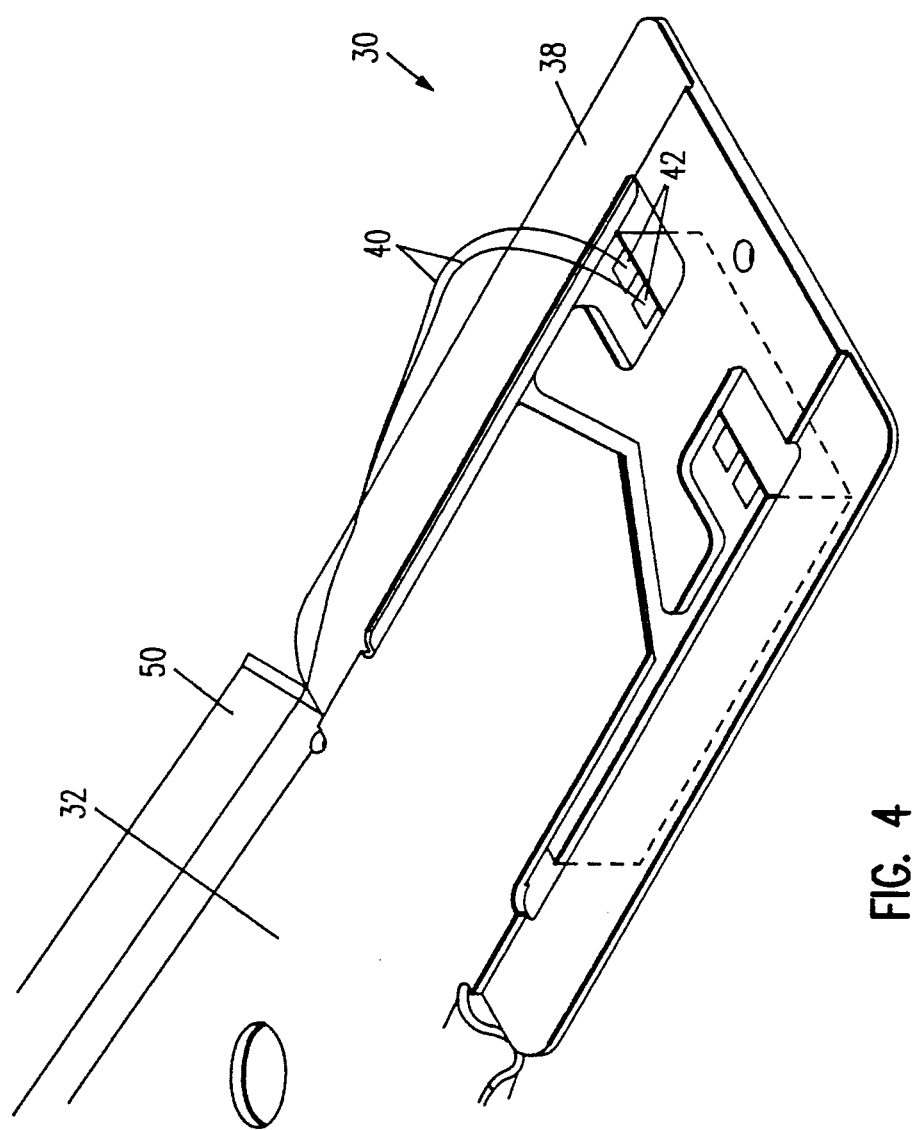
FIG. 4 is a partial perspective view of the flexure/head assembly of FIG. 3.

FIG. 4 is a partial perspective view of a flexure/head assembly 30 such as that of FIG. 3. In this view, it is particularly obvious that the wires 40 connected to the transducer terminations 42 are routed to the channel 50 formed in the edge of the rigid beam 32 entirely without passing beneath the gimbal beam 38. With such a routing for the wires 40, contact between the wires 40 and the surface of the disc is clearly impossible.

Figure 5:
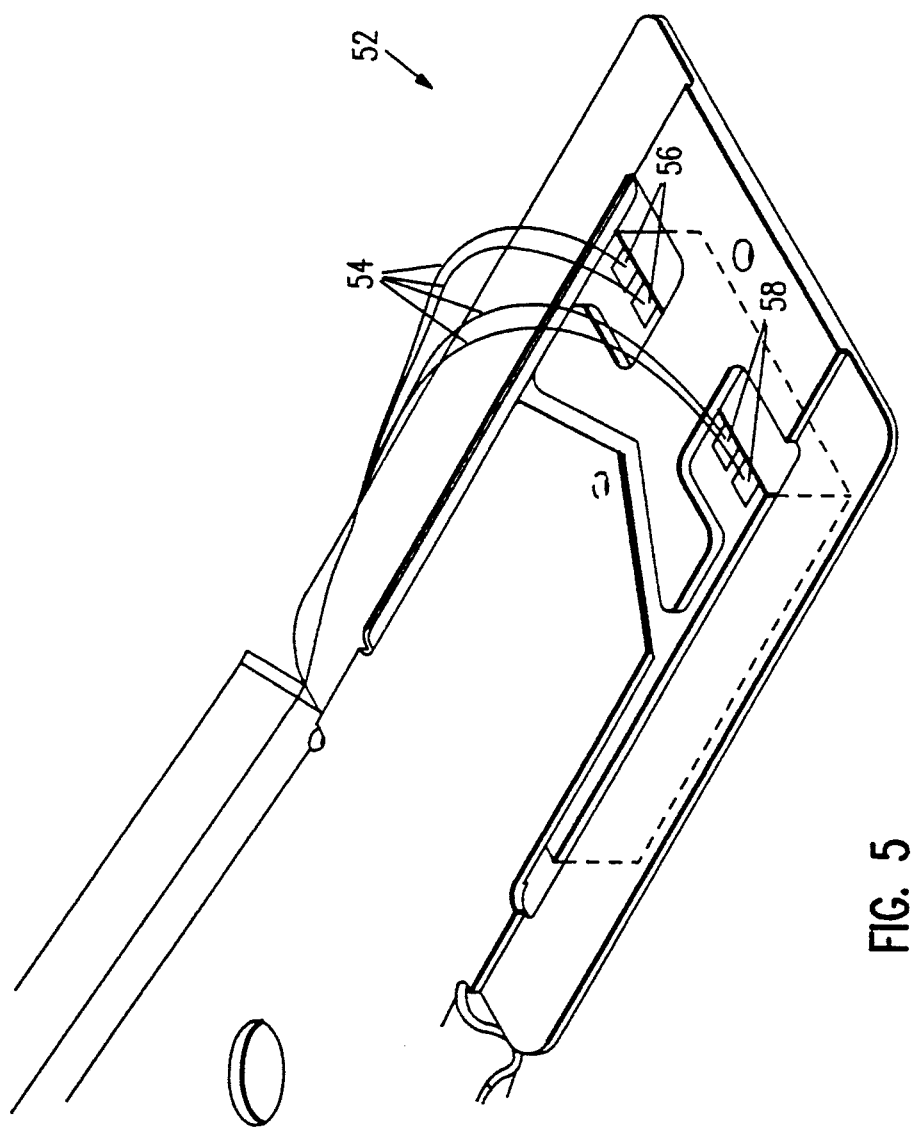
FIG. 5 is a partial perspective view of a second embodiment of a flexure/head assembly made in accordance with the present invention.

Turning now to FIG. 5, a flexure/head assembly 52 is shown that is very similar to that of FIG. 4, except for the fact that there are now four wires 54 connected to the transducer terminals 56, 58. It will be recalled that the discussion of FIGS. 1 through 4 assumed the use of an inductive-type of read/write transducer. It is now becoming more common to make use of magnetoresistive (MR) heads. In these MR heads, there are two separate elements which must be controlled—an inductive element and a magnetoresistive element—and thus there must be four transducer terminations, as is shown in FIG. 5. For instance, the transducer terminations designated 56 could be connected to the inductive element, while the transducer terminations designated 58 could be used for the magnetoresistive element. In any case, it is apparent that the gimbal design of the present invention is particularly suitable for use with a head which utilizes four transducer terminations disposed on both sides of the slider mounting tab 36.

The transducer termination layout of FIG. 5 does, however, assume that a single MR transducer would be located on the slider. As was mentioned above, it is common practice to have each slider manufactured with a transducer element located in both lateral areas of the trailing edge of the slider. Again, there are a couple of reasons for this practice. Firstly, with transducers located on both lateral sides of the slider, the slider is well adapted for use as either an upward-facing assembly—or "up head"—or as a downward-facing assembly—or "down head"—while still allowing the wire terminations and transducers of the unit to be vertically aligned. Secondly, since a small but statistically significant number of the transducers will be found to be faulty, the use of paired transducers will allow a slider with a single operational transducer to be designated for use exclusively as either an up head or down head, depending upon which transducer operates properly. This practice clearly reduces the amount of scrap in the manufacturing process and thus reduces the cost of the entire disc drive.

In a slider unit incorporating two MR transducer assemblies, there must be eight transducer terminations, and this means that a significant portion of the upper surface of the slider must be devoted to these terminations.

Figure 6:
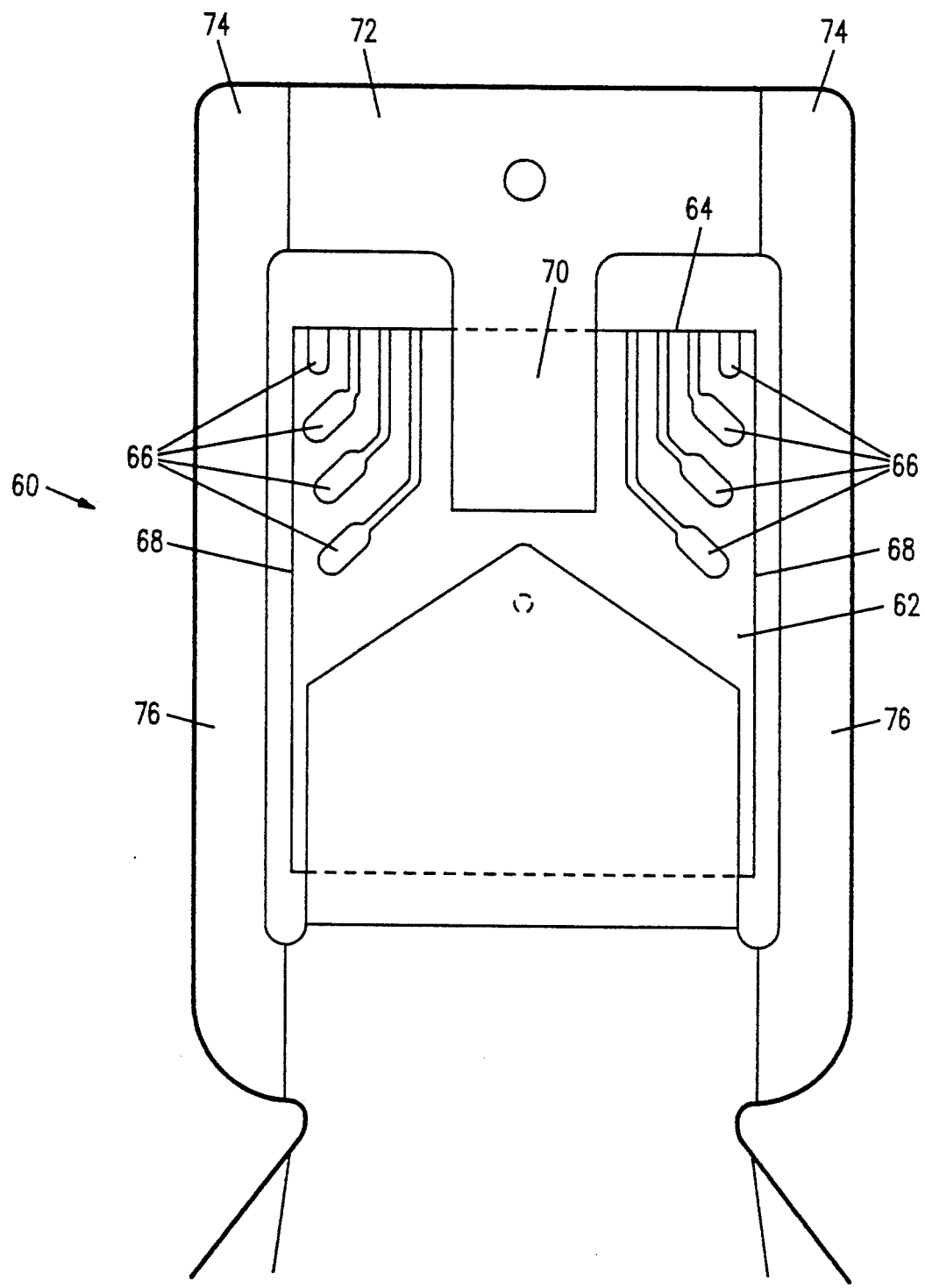
FIG. 6 is a plan view of a third embodiment of the present invention.

Turning now to FIG. 6, show is a plan view of a flexure/head assembly 60 which includes a slider 62 which incorporates paired MR transducers (not shown) on its trailing surface 64. The transducer terminations 66 are shown as being grouped in fours and lie in substantially a straight line along the lateral edges 68 of the slider 62. Because of the amount of space occupied by the four transducer terminations 66 on both sides of the slider mounting tab 70, the shape of the slider mounting tab 70 has been changed to be a simple rectangular tab connected to the cross beam 72 which connects the gimballing ends 74 of the gimbal beams 76. Since the cross beam 72 and slider mounting tab 70 are envisioned to retain the full thickness of the material, these components form a mounting point which is strong enough to hold the slider 62 while still allowing the desired gimballing action.

Figure 7:
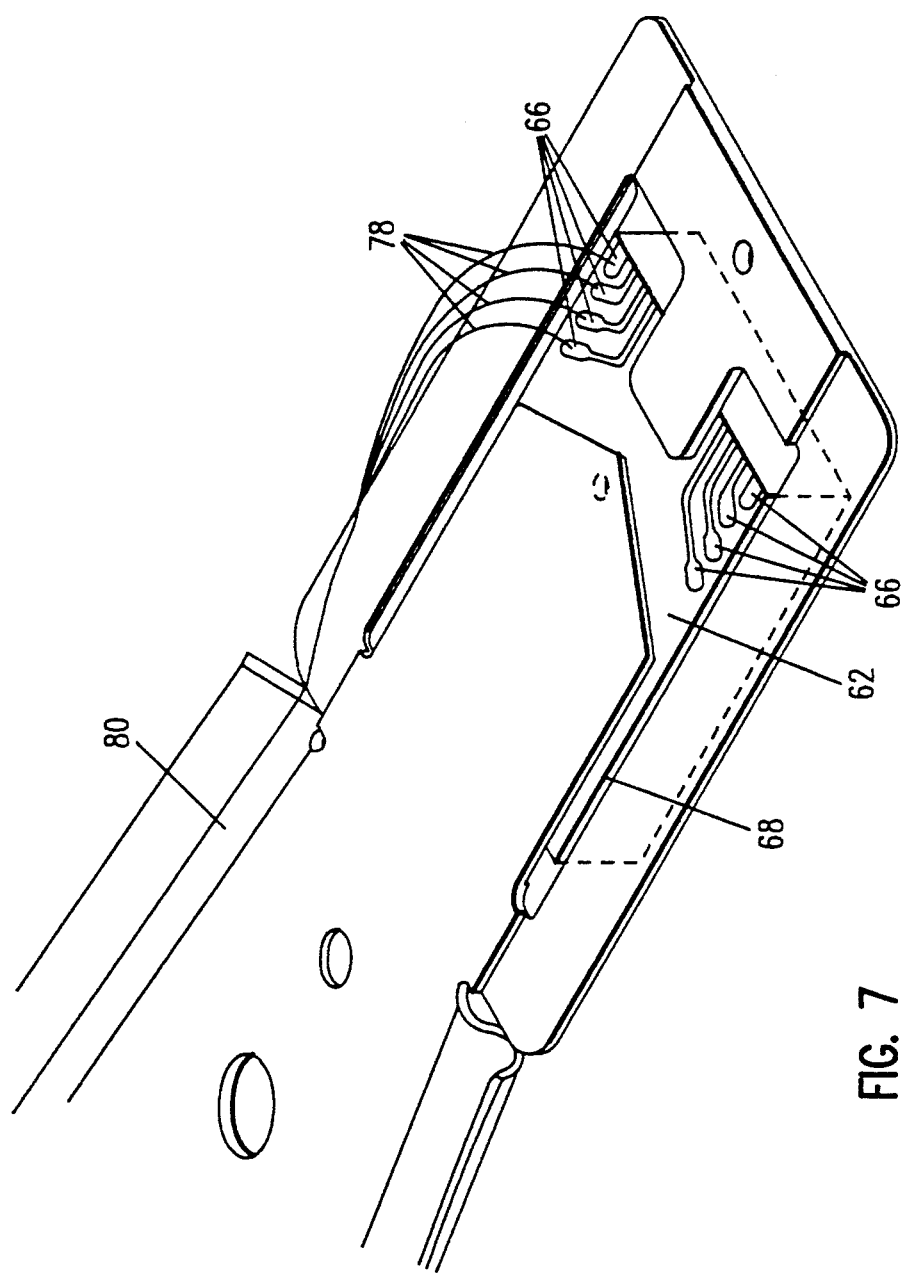
FIG. 7 is a partial perspective view of the flexure/head assembly of FIG. 6.

FIG. 7 is a partial perspective view of the flexure/head assembly of FIG. 6, including a set of four wires 78 connected to the transducer terminations 66. As is shown clearly in FIG. 7, having all four transducer terminations 66 aligned along the lateral surface 68 of the slider 62 allows for simple efficient routing of the wires 78 from the transducer terminations 66 to the channels 80 along the outer edges of the rigid beam portion 82 of the flexure.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a flexure for supporting a head in cooperative arrangement with a surface of a disc in a disc drive data storage device, the flexure being formed from a single piece of material and including attachment means for attaching the flexure to an actuator for moving the head to desired locations on the surface of the disc, and at least one resilient beam means, attached at a first end to the attachment means, for exerting a downward force on the head in a direction toward the surface of the disc, and a rigid beam section attached at a second end of the resilient beam means for transferring the downward force from the resilient beam means, the improvement comprising:

a gimbal for mounting a top-terminated head including: a load point tab extending from the rigid beam and having proximate its distal end a load point button contacting a top surface of the head, a pair of gimbal beams laterally displaced from the load point tab and having first ends attached near the base of the load point tab, a cross beam member connecting second ends of the gimbal beams, and a slider mounting tab connected to the cross beam member and extending toward the load point tab, the slider mounting tab having, over at least a part of its length a width approximately one-third the width of the head whereby the outer approximate one-third of the head width on either side of the slider mounting tab is unobstructed by the slider mounting tab to allow for attachment of wires to transducer terminations for the head.

2. A gimbal for mounting a top-terminated head, the gimbal formed at the end of a load beam, the load beam having a thickness, the load beam and gimbal being formed of a single piece of material, the gimbal comprising:

a pair of longitudinally spaced tabs:

a first tab having an integral button on that side of the tab closest to the head when the head is mounted to the flexure, the integral button formed by partially etching the first tab on that side of the tab closest to the head when the head is mounted to the flexure; and a second tab having a head mounting surface; and a pair of partially etched connecting beams connecting said first and second tabs, the thickness of the connecting beams being reduced from the thickness of the load beam to reduce the stiffness of the connecting beams;

the improvement comprising:

the second tab having a base portion having a first width connected to said connecting beams and a projecting portion projecting from said base portion toward said first tab; the projecting portion having a second width over at least part of its length, the second width being less than the first width of said base portion; whereby wire contacts may be made to top surface contacts mounted on said head when said head is mounted to said projection portion.

* * * * *

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

Cover Page, at [56], beneath "U.S. PATENT DOCUMENTS", insert the following:

--3,931,641 01/76 Watrous .......... 360/104
  4,167,765 09/79 Watrous .......... 360/103
  4,197,566 04/80 Suzuki et al. .... 360/103
  4,245,267 01/81 Herman .......... 360/104
  4,399,476 08/83 King .............. 360/104
  4,797,763 01/89 Levy et al. ...... 360/104
  4,853,811 08/89 Brooks, Jr. et al. 360/103
  4,954,919 09/90 Yamada .......... 360/104
  4,991,045 02/91 Oberg .......... 360/104
  4,992,898 02/91 Wanlass .......... 360/104
  4,996,616 02/91 Aoyagi et al. .... 360/104
  4,996,623 02/91 Erpelding et al. .. 360/104

OTHER PUBLICATIONS

Type 16 Suspension Product Summary from Hutchinson Technology, July 15, 1991 (10 pages)--;

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

Column 1, line 22, after the heading "2. Brief Description of the Related Art", insert the following:

— Disc drives of the type known as "Winchester" disc drives are well known in the industry. Such disc drive data storage devices typically contain a stack of rigid discs coated with a magnetic medium on which digital information is stored in a plurality of circular concentric tracks. The storage and retrieval of data -- also called "writing" and "reading", respectively -- is accomplished by an array of heads, usually one per disc surface, which are mounted on an actuator mechanism for movement from track to track. The most common form of actuator used in the current generation of disc drive products is the rotary voice coil actuator, which uses a voice coil motor (VCM) coupled via a pivot mechanism to the heads to access data on the disc surfaces. The structure which supports the heads for this movement is referred to as a head/gimbal assembly, or HGA.

The HGA in a typical disc drive consists of three components:

1. a slider, which features a self-acting hydrodynamic air bearing and an electromagnetic transducer for recording and retrieving information on a spinning magnetic disc. Electric signals are sent to and received from the transducer via very small twisted copper wires;

2. a gimbal, which is attached to the slider and is compliant in the slider's pitch and roll axes for the slider to follow the topography of the disc, and is rigid in the yaw and in-plane axes for maintaining precise slider positioning, and;

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

3. a load beam, which is attached to the gimbal and to a mounting arm which attaches the entire assembly to the actuator. The load beam is compliant in the vertical axis to, again, allow the slider to follow the topography of the disc, and is rigid in the in-plane axes for precise slider positioning. The load beam also supplies a downward force that counteracts the hydrodynamic lifting force developed by the slider's air bearing.

Since the introduction of the first Winchester disc drive, the physical size of the slider has been progressively reduced, first from the original Winchester head to the so-called "mini-Winchester", and more recently to the 70 and 50 Series heads, which are 70% and 50% the size, respectively, of the mini-Winchester slider. While these size reductions are significant, the overall vertical dimension of the HGA has been dictated more by the slider-supporting mechanism than by the size of the slider itself.

The load beam and gimbal comprise an assembly generally known as a head suspension, head flexure, or simply a flexure. An example of such a flexure is described in U. S. Patent 4,167,765.

Historically, the gimbal and load beam are fabricated discretely. The gimbal and load beam pieces are realized by chemically etching 300 series stainless steel foil into the desired shape, and then the two pieces are attached by means of laser welding.

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

The general technology trend in disc drive data storage devices is continual shrinking of the physical size of the product while providing increased data storage capacity. The down-sizing of the product has required smaller components, especially the principal components such as discs, sliders and flexures. Additionally, disc drive designers seek to add capacity to their designs by incorporating as many discs as possible within defined package dimensions. As the number of discs in the unit increases, the spacing between the discs decreases, thus further driving the need for smaller sliders and flexures.

Another industry trend is to provide the user of disc drives with high data storage capacity at low cost. This requires developing improved data recording technology and finding lower cost ways of manufacturing the components of the disc drive.

The use of discrete gimbal and load beam components laser welded together, as shown in the '765 patent, has become problematic in disc drives of the current 2.5", 1.8" and 1.3" generations of disc drives. In such units, the flexures must become thinner in order to allow desirable close spacing of the discs, while the overlapping required to laser weld two discrete components necessitates increased thickness in the flexure.

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

Furthermore, the use of thinner gimbal and load beam components increases the likelihood of residual stress caused by the laser welding of the two components together. It has been found that laser welding produces residual tensile stress in the material local to the welds. This causes the flexure to distort. In the longitudinal direction, the flexure curls from the residual weld stress, and this makes it more difficult to fit the flexure between closely spaced discs during the manufacturing process. Further, if the welds are not placed symmetrically about the centerline of the flexure, the residual weld stress will cause a torsional distortion, or twisting, of the flexure. Such an flexure is undesirable since the twist will create a moment, or torque, on the slider's air bearing, causing unwanted changes in the flying attitude of the head, and potentially rendering the assembly unusable.

The welding process is also a substantial portion of the labor that goes into the manufacture of a flexure, and it would, thus, be advantageous to eliminate the practice of making discrete gimbals and load beams and welding the two together for cost reduction.

Since the gimbal and load beam components must overlap in flexures of existing art, the emphasis on reducing the thickness of the flexure assembly has most often focused on reducing the thickness of the individual gimbal and load beam components. The thickest area of the load beam is the region known as the rigid beam, which usually features flanges along the outer edge along the longitudinal axis of the flexure. U.S. Patent 4,996,616 teaches how a pair of drawn ribs can provide reinforcement of the rigid beam section of the flexure. Unfortunately, the drawn pair of ribs of '616 requires that the

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

flexure material be strained to exceedingly high levels. Such stain can introduce cracks in the drawn material, and high stresses in the material near the ribs.

Various attempts have been made to solve the problems inherent in welding a gimbal and load beam together by devising a flexure in which the gimbal and load beam are formed from a single piece of material and would thus require no welding. An example of such an integrated gimbal and load beam is presented in U.S. Patent 4,245,267. A second example is known as the HTI Type 16, or T16, manufactured by Hutchinson Technology, Incorporated. Both of these flexures have a gimbal incorporated into the load beam and, of course, no gimbal-to-load beam welds. Both include a bonding surface on which adhesive is placed to secure attachment of the slider to the flexure. A plurality of beams, etched into the load beam, connects this bonding surface to the load beam portion of the flexure and provides the desired gimbal characteristics.

One failing of the flexure of the '267 patent and the T16 flexure relates to an element of flexure design commonly referred to as "load point". Simply stated, load point refers to the single point of contact where the downward force of the load beam is applied to the slider. Proper selection of this load point ensures that the forces related to the hydrodynamic air bearing of the slider are properly balanced. In prior art flexures such as the one described in the '765 patent, load point is developed by forming an upward-extending dimple in the gimbal bonding surface. The load beam contacts the spherical surface of this dimple at a single point to allow proper gimbal action. In the case of the '267 and T16 flexures, however, a well defined load point is not provided, and, thus, an undesirably wide range of variation in slider flying characteristics is associated with these types of flexure.

A second fundamental problem with the '267 and T16 types of flexures is that the downward force of the load beam is applied to the slider by placing the gimbal beams into bending mode, and the gimbal beams must therefore be stiff in bending mode. These same gimbal beams, however, must be compliant in bending mode to allow the proper gimballing action. This conflicting requirement results in designs that either work poorly as a gimbal or become deformed under load.

A third problem with the '267 and T16 flexures is that the slider bonding surface, in general, covers a large area over the center of the slider. The slider is attached to the flexure with an adhesive epoxy, and, in order to reduce the cure time of the adhesive, the assembly is usually heated in an oven. Since the slider and flexure are made of dissimilar materials with different coefficients of linear thermal expansion, thermally induced strains develop at the bond when the assembly cools. These strains can distort the slider and undesirably change the flatness of the air bearing surface of the slider, thus, once again, introducing unacceptably wide variation into the flying characteristics of the heads. -- ;

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

Figure 8:
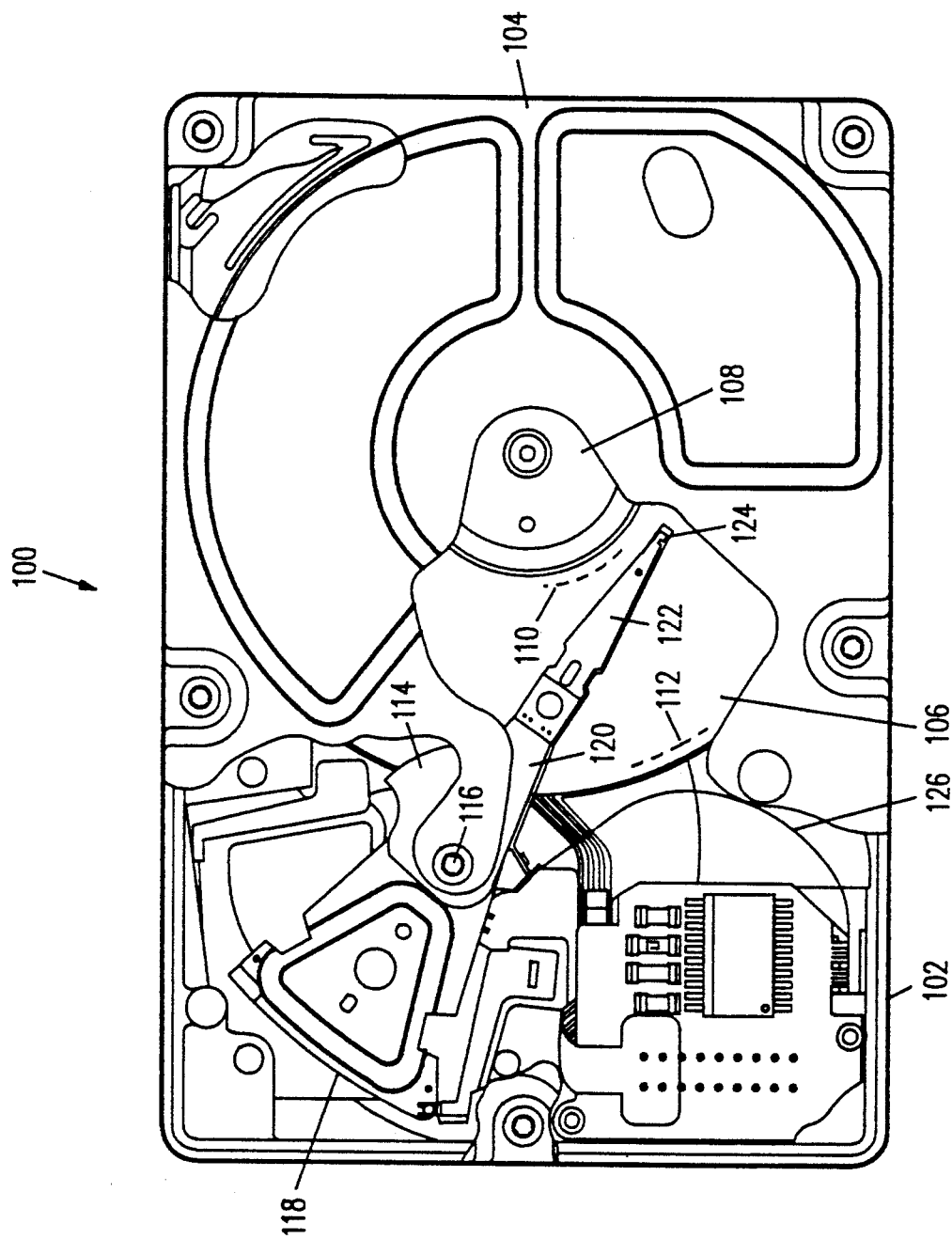
FIG. 8 is a plan view of a disc drive data storage device in which the present invention is particularly useful.

It is certified that error appears in the above-identified patent and that said Letters Patent is hereby corrected as shown below:

Column 2, line 41, after the heading "Detailed Descripttiton of the Invention", insert the following:

-- Referring now to the drawings and more specifically to Figure 8, shown is a disc drive 100 in which the present invention is particularly useful. The disc drive 100 includes a base member 102 which, in cooperation with a top cover 104 (shown in partial cutaway), forms a sealed environment to protect the delicate internal components from outside contaminants. A number of rigid discs 106 coated with a magnetic medium are mounted for rotation on a spindle motor (shown generally at 108). The surfaces of the discs 106 hold a large number of concentric circular tracks to which information is written and from which information is read. These tracks are represented by the innermost and outermost tracks, designated by broken lines 110 and 112 respectively.

An actuator body 114 is adapted for rotation about a pivot shaft 116 by a voice coil motor (VCM), shown generally at 118. On the side of the actuator body 114 opposite the VCM 118 are a number of head mounting arms 120 to which are attached a plurality of flexures 122 for the mounting of sliders 124. Power for the VCM 118, as well as the signals used to read and write data, is passed via a printed circuit cable (PCC) 126.

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

As was previously mentioned, the flexure of the present invention is formed by the process of chemical etching. In usual chemical etching processes, the material to be etched is first coated on both sides with a material called resist. The resist is patterned using a stencil and exposing the resist to a light source. Unexposed resist is then stripped away, leaving exposed metal that will be etched away in the presence of an acid-like etchant. Both sides of the material are treated in this manner, with the pattern on both sides being very accurately aligned. This is the process used to define the perimeter outline of the flexure of the present invention and all through openings.

In half-etching, the pattern of the stencil on one side of the material is dissimilar to that on the other side. This also is a well known technique for etching text, art or half-tone photographs into sheet metal. It is known that if the area to be half-etched is large -- that is, it has a length or diameter many times that of the material thickness -- the depth of the half-etching will be approximately sixty percent that of the material thickness.

The process of full- and half-etching is used to produce several of the features of the flexure of the present invention. -- ;

UNITED STATES PATENT AND TRADEMARK OFFICE
CERTIFICATE OF CORRECTION

PATENT : 5,331,489

DATED : July 19, 1994

INVENTOR(S) : Lyle G. Johnson and Yoshiki Midori

It is certified that error appears in the above-identified patent and that said Letters Patent is hereby corrected as shown below:

Column 6, line 25, after "length" insert a comma --,--.

Signed and Sealed this

Seventeenth Day of January, 1995

Attest:

BRUCE LEHMAN

*Attesting Officer*     *Commissioner of Patents and Trademarks*